United States Patent [19]

Souza

[11] 4,129,959
[45] Dec. 19, 1978

[54] UNIVERSAL TRIGGER MECHANISM FOR ROTATING FRAME ANIMAL TRAPS

[75] Inventor: Anthony J. Souza, Lancaster, Pa.

[73] Assignee: Woodstream Corporation, Lititz, Pa.

[21] Appl. No.: 830,885

[22] Filed: Sep. 6, 1977

[51] Int. Cl.² ............................................. A01M 23/24
[52] U.S. Cl. ......................................................... 43/92
[58] Field of Search ............................ 43/88, 90, 92–97

[56] References Cited

U.S. PATENT DOCUMENTS

| | | | |
|---|---|---|---|
| 3,411,234 | 11/1968 | Harrison | 43/97 |
| 3,421,251 | 1/1969 | Hofmeister | 43/92 |
| 3,426,471 | 2/1969 | Lehn | 43/92 |
| 3,991,509 | 12/1976 | Frost | 43/90 |
| 4,037,350 | 7/1977 | Souza | 43/96 |

Primary Examiner—James L. Jones, Jr.
Attorney, Agent, or Firm—Holman & Stern

[57] ABSTRACT

An improved trigger mechanism particularly useful with a rotating frame animal trap, the present trigger mechanism comprises a rotary universal joint which allows angular displacement of the trigger mechanism about a frame of the trap on which said trigger mechanism is pivotally carried. Free ends of spaced prongs extending from the trigger mechanism toward the interior of the trap contact an animal entering the trap from any direction, sufficient force caused by such contact angularly displacing the trigger mechanism to spring the trap.

12 Claims, 4 Drawing Figures

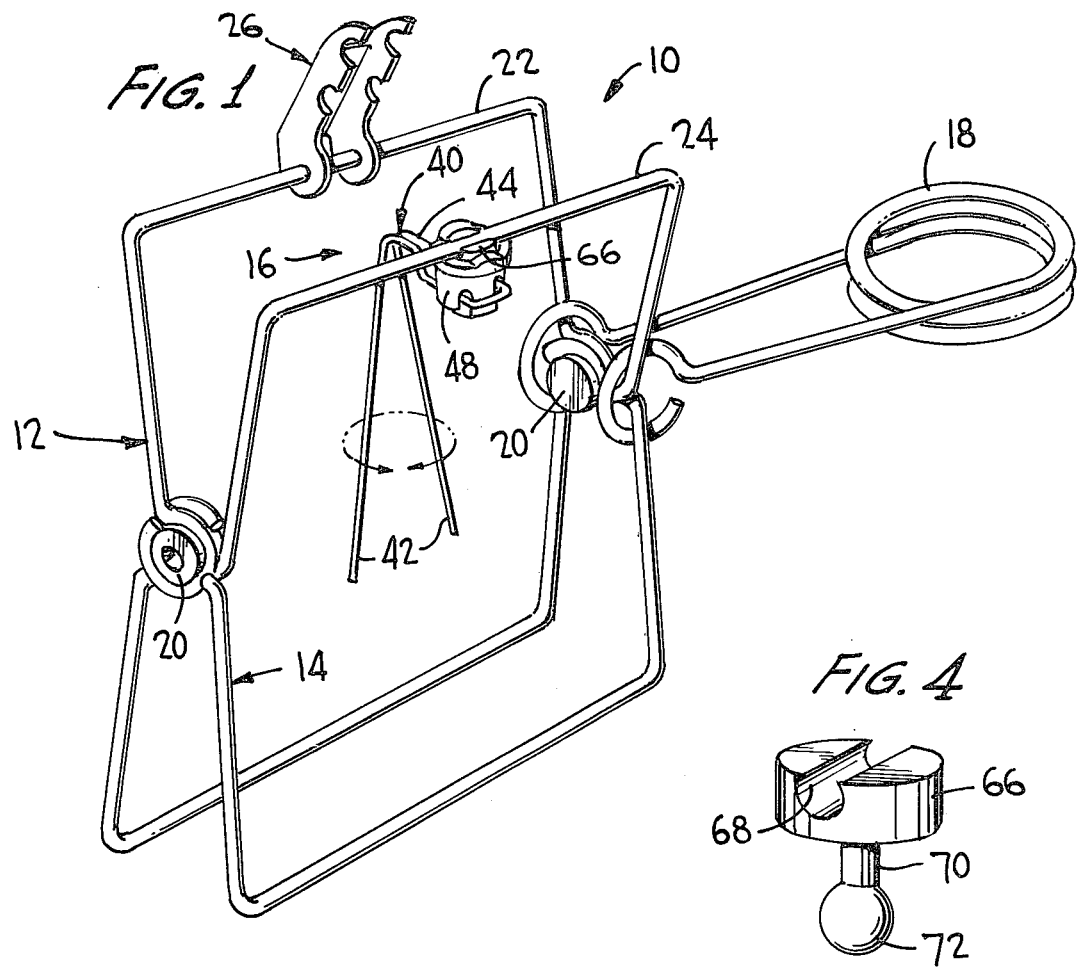
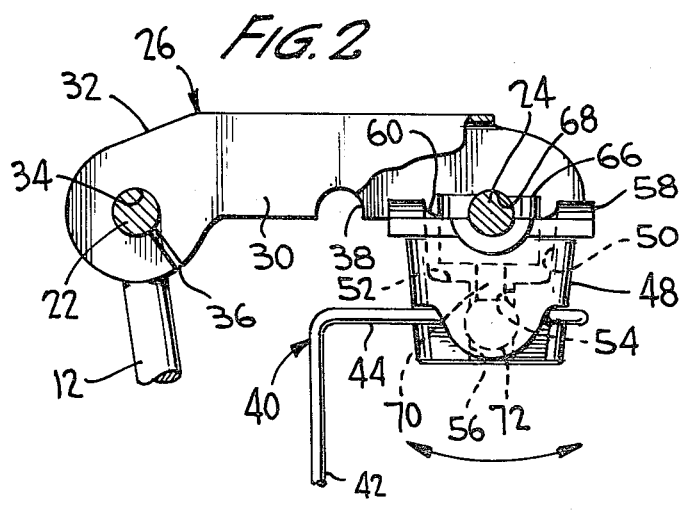
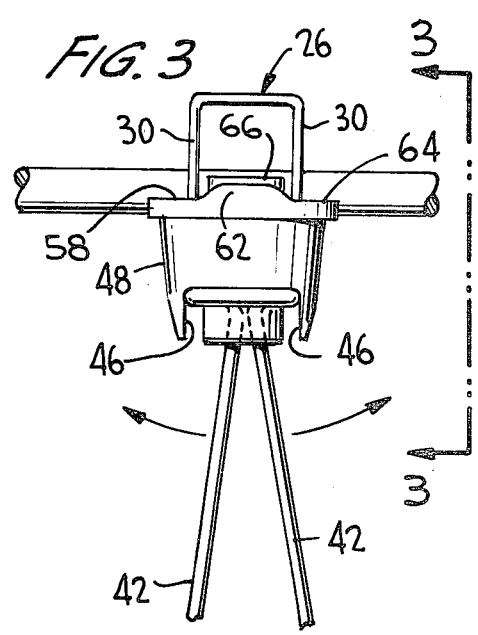

UNIVERSAL TRIGGER MECHANISM FOR ROTATING FRAME ANIMAL TRAPS

BACKGROUND OF THE INVENTION

1. Field of the Invention

The invention relates to animal traps of the rotating frame type and particularly relates to improved trigger mechanisms for such traps.

2. Description of the Prior Art

Rotating frame traps have long been used in the humane trapping of fur bearing and other animals. As is well known in the art, a rotating frame trap typically comprises a pair of similar frames, which frames can be of a generally square, rectangular, or part-trapezoidal shape, the frames being pivotally connected at adjacent ends for relative rotation on a common axis. Two pairs of co-acting jaws are thereby formed by the sides of the frames. At least one actuator, consisting of a coil spring having arms terminated in closed rings slidable along and encircling one set of adjacent ends of the frames, is used to urge the jaws toward a closed position and, when the trap is sprung, to maintain said jaws in the closed position. In U.S. Pat. No. 3,010,245, issued Nov. 28, 1961, such a rotating frame trap is described in which the ends which cooperate with the rings are shaped so that in the set position of the trap, these ends lie substantially parallel to each other, the central portions of said ends near the common axis of the frames forming a cross within the rings on the arms of the coil springs. The disclosure of this patent is incorporated hereinto by reference. Trigger apparatus useful with rotating frame traps such as above-discussed, has been described in the above-mentioned patent or in Lehn, U.S. Pat. No. 2,947,107, issued Aug. 2, 1960. Such trigger mechanisms maintain the frames of the trap in an open position when the trap is set, the frames being released when the trap is sprung in order to permit, as a result of the action of the spring and rings on the end of the actuator, rapid rotation of the frames through an angle of approximately 90°, the jaws of the trap thus quickly striking and killing an animal in the trap. Commonly used trigger mechanisms, such as that described in the Lehn Patent referred to hereinabove, comprise a pair of prongs adapted to project inwardly toward the center of an open, set trap, which prongs are fixedly connected to a first sleeve rotatably connected to one of the sides of one of the frames of the trap. A bar rotatably mounted by a second sleeve on the adjacent side of the other frame opposite the first sleeve, has one or more notches formed therein which are adapted to releasably fit over the first frame through a slot in the first sleeve, the bar thereby releasably holding the trap frames in open set positions against the bias of the actuator. When the prongs are moved forwardly or backwardly in a plane essentially perpendicular to the plane of the trap, for example by an animal passing through the open, set trap, the prongs rotate the first sleeve, the bar being thereby dislodged to permit the trap to close. However, such prior trigger mechanisms can effectively only be activated when the animal biases the prongs along a line substantially perpendicular to the plane in which the frame members lie. Thus, an animal contacting the prongs from a sidewise direction or from a direction skew from the normal forward-backward direction does not produce the necessary force to spring the trap.

The present invention provides a trigger mechanism for a rotating frame trap which is more likely to ensure that an animal will contact inwardly projecting prongs of the trigger mechanisms with sufficient force to activate the mechanism, thereby springing the trap.

SUMMARY OF THE INVENTION

The present invention comprises a rotating frame animal trap having an improved trigger mechanism, the present trigger mechanism activating the trap on contact between trigger portions of the mechanism and an animal, the contact occurring from any orientation of said animal to said trigger portions. Rotating frame animal traps are formed of a pair of frames, which frames act as the "jaws" of the trap and are releasably held in a set position by means of a latch such as is disclosed by Lehn in U.S. Pat. No. 2,947,107, the disclosure of which patent is incorporated hereinto by reference. The latch is pivotally mounted on a side portion of one of the frames, the latch essentially comprising an elongated body member formed of two-spaced side walls. The side walls have pairs of aligned notches spaced along the lower edge portions thereof, each pair of the notches being adapted to receive portions of the other of the frames when the trap is in a set position. The latch thus maintains the frames in a set position against the closing force exerted by the spring actuator or actuators. The improved trigger mechanism of the present invention is mountd on the frame which is received within one pair of the notches of the latch, the trigger mechanism being surmounted by the latch, trigger portions of the mechanism being angularly moveable relative to the frame in a universal manner, that is, the trigger mechanism is capable of activating closure of the trap regardless of the direction from which contact of a sufficient force is made against the trigger mechanism. When a force of a sufficient level is exerted against trigger portions of the present mechanism, such as by an animal entering or moving about in the trap, the trigger mechanism dislodges the frame from the pair of notches in the latch, thereby disengaging the latch from the frame to remove any resistance to the closing force exerted by the actuator.

The present trigger mechanism comprises a substantially cylindrical body member having cam surfaces formed on upper portions thereof and an enlarged hollow interior recess formed between said cam surfaces. A frame engaging member is pivotally mounted and slidable along the side portions of the other of the frames, the frame engaging member being received within the enlarged hollow interior recess of the cylindrical body member for free rotational movement therein. The frame engaging member has a reduced neck portion formed in the end thereof opposite of the end which is mounted to the other of the frames, the neck portion extending through an aperture formed in the floor of the hollow interior recess and having a ball joint formed on the distal end thereof. The ball joint is freely received for rotation within a cylindrical channel formed in the lower portion of the cylindrical body member, the aperture communicating the hollow interior recess and the cylindrical channel. Thus, the body member of the trigger mechanism is mounted to the other of the frames by the frame engaging member, the body member being rotatable laterally about the ball joint and being further pivotable in a plane perpendicular to the longitudinal axis of the portion of the other frame to which the frame engaging member is pivotally mounted. The cam surfaces abut lower edge surfaces of the side walls of the latch when the trap is in the set position, a sufficient force exerted on a trigger arm extending into the interior of the trap from the trigger mechanism causing the latch to be dislodged from engagement with the other frame member, thereby springing the trap.

Accordingly, it is an object of the invention to provide an improved trigger mechanism for a rotating frame trap which ensures that an animal in the trap is caught when contact of a sufficient force is made between the animal and the trigger mechanism from any direction.

It is a further object of the invention to provide an improved rotating frame animal trap capable of humanely trapping and killing an animal regardless of the direction from which the animal enters the trap or contacts the trigger mechanism of said trap.

Other objects and advantages of the invention will become more apparent in light of the following description of the preferred embodiments of the invention.

BRIEF DESCRIPTION OF THE DRAWINGS

FIG. 1 is a perspective view of a rotating frame trap having a trigger mechanism according to the invention prior to setting of the trap;

FIG. 2 is a detailed elevational view of the present trigger mechanism in a set position;

FIG. 3 is a fragmentary sectional view taken along lines 3—3 of FIG. 2; and,

FIG. 4 is a perspective view of a portion of the present trigger mechanism.

DESCRIPTION OF THE PREFERRED EMBODIMENT

Referring now to FIG. 1, a rotating frame animal trap is seen at 10 to be substantially in the open position immediately prior to setting thereof. The trap 10 comprises two frames 12 and 14, a trigger mechanism shown generally at 16, and at least one spring actuator 18. The frames 12 and 14 are pivotally mounted to each other on each side thereof by means of the central pivot sections 20, a line between the sections 20 defining a pivot axis of the trap 10. The actuator 10 preferably takes the form of an expanding coil spring adapted to force the ends thereof away from one another, thereby to exert a closing force on the frames 12 and 14 and to thus rotate the frames about the pivot axis of the trap. The structure and operation of the rotating frames 12 and 14 and actuator 18 are known in the art and are described in detail in U.S. Pat. No. 3,010,245. As can also be understood in light of the teachings of the prior art, the trap 10 can be alternatively formed of frame members of other than the square shape shown in FIG. 1, the part-trapezoidal frame member disclosed in U.S. Pat. No. 3,760,531 being an example of an alternative conformation. It should further be understood that a second actuator could be used about the other of the pivot sections 20 in order to provide additional trap closure force.

The frames 12 and 14 have side members 14 and 24 respectively which form the jaws of the trap 10, the longitudinal axes of the side members 22 and 24 being parallel to the pivot axis of the trap 10. The side members 22 and 24 are releasably held in the open or "set" position by means of a latch 26, the latch being pivotally carried on the frame 14 as is disclosed by Lehn in U.S. Pat. No. 2,947,107. Referring also now to FIGS. 2, 3 and 4, the latch 26 is seen to comprise a U-shaped body member 28 having spaced side walls 30 which terminate at rounded inner end portions 32, the end portions 32 being angled obtusely relative to the side walls 30. The inner end portions 32 are provided with openings 34 which receive the side member 22 of the frame 12 therein. Slots 36 formed in the end portions 32 intersect the openings 34 to facilitate fitting of the latch 26 onto the side member 22, portions of the latch adjacent the openings 34 being spread apart to slip the side member 22 into the openings 34, the portions being pressed back together to retain said latch 26 in place on the frame 12. When assembled on the side member 22, the latch 26 is rotatable thereabout in a pivotal fashion and is also slidable longitudinally of the side member 22. The side walls 30 of the latch 26 are provided on lower edges thereof with a plurality of pairs of spaced aligned notches 38, one notch in each pair of notches being disposed in one each of the side walls 30. The notches 38 are substantially semi-circular in conformation, the depth of the notches being slightly greater than the radius of the cylindrical wire from which the frames 12 and 14 are preferably formed. The latch 26 is thus prevented from inadvertent slippage from the side member 22 when the trap 10 is set. The notches 38 fit over portions of the side member 22 of the frame 12 to retain the side members 22 and 24 in spaced relation against the closing force exerted by the actuator 18.

The trigger mechanism 16 is carried on the side member 24 of the frame 14 in oppositely facing relation to the location of the frame 12 on which the latch 26 is pivotally carried. The trigger mechanism 16 is capable of rotation about the longitudinal axis of the side member 22 and is also slidable along said side member. The trigger mechanism 16 comprises a trigger arm 40 which preferably has two prongs 42 extending therefrom inwardly into the interior of the trap 10, the prongs 42 being spaced apart at an angle to each other in the plane of the entrance opening of the trap when in the set position. The trigger arm 40 has an upper portion 44 which extends from the anterior ends of the prongs 42 at a substantially 90° angle to the longitudinal axes of said prongs 42, the upper portion 44 engaging and being mountably received within spaced grooves 46 in a cylindrical body member 48, the body member 48 forming a major portion of the trigger mechanism 16. The upper portion 44 of the trigger arm 40 is sufficiently elongated so as to cause the prongs 42 to be substantially centered within the interior of the trap 10 when the trap is set. Accordingly, the prongs 42 cannot be usually contacted to activate the trap 10 unless the animal is sufficiently within the interior of the trap to ensure that a killing blow is delivered on closure of the frames 12 and 14.

The body member 48 is substantially cylindrical in conformation, said member 48 tapering slightly from an open upper portion to the lower portion thereof, the grooves 46 being formed in the lower portion of said member 48. A hollow cylindrical recess 50 is formed longitudinally of the member 48 in the upper portion thereof, the recess 50 being open to ambient at the upper portion thereof and having a floor 52 internally of the member 48 in which a reduced aperture 54 is formed, the aperture 54 communicating with the recess 50 with a cylindrical channel 56 formed longitudinally within the member 48 and in the lower portion thereof, the channel 56 communicating at its open end to ambient. The body member 48 has an annular flange 58 formed about the upper portion thereof, the flange 58 being interrupted at two diametrically spaced locations thereof by substantially semi-cylindrical notches 60, the notches 60 extending also into body portions of the body member 48. A line connecting the centers of the notches 60 lies parallel to the longitudinal axis of the side member 24 of the frame 14 when the trigger mechanism 16 is mounted to the frame 14. The annular flange 58 can further be provided with raised abutments 62 spaced at 90° angles from the notches 60, the abutments being of a length slightly less than the linear distance between the side walls 30 of the latch 26, the abutments 62 being substantially received between the side walls 30 when the latch 26 and the trigger mechanism 16 operatively engage the frames 12 and 14 in the set position. The abutments 62, when disposed between said side walls 30 of the latch 26, essentially maintain the body member 48, and thus the trigger mechanism 16, in a desired orientation on the side member 24 of the frame 14.

Planar shoulders 64 adjacent either ends of the abutment 62 and forming portions of the upper surfaces of the annular flange 58 abut the lower edge surfaces of the side walls 30 of the latch 26 when said latch and trigger mechanism 16 operatively engage the frames 12 and 14 in the set position. The body member 48 is mounted to the side member 24 of the frame 14 by a frame-engaging member 66, the member 66 being substantially cylindrical in shape and having a nearly enclosed elongated recess 68 formed in the upper portion thereof, the recess 68 being substantially cylindrical in conformation. The frame-engaging member 66 has a reduced neck 70 which extends through the aperture 58 formed in the floor 52 of the recess 50 in the body member 48, the member 66 being loosely received in the recess 50 in said body member 48. The neck 70 terminates within the channel 56, a ball joint 72 being formed on the distal end of said neck 70. The neck 70 and ball joint 72 can be integrally formed, the anterior end of the neck 70 being extended through the aperture 54 and into engagement with a cylindrical recess (not shown) in the lower portion of the frame-engaging member 66 to facilitate assembly of the trigger mechanism 16. Since the ball joint 72 is of a diameter greater than the diameter of the aperture 54 (but less than the diameter of the cylindrical channel 56), some portion of the neck 70, ball joint 72 or associated structure must be originally formed separately to allow assembly thereof with the frame-engaging member 66 within the body member 48.

The recess 68 in the frame-engaging member 66 receives a portion of the side member 24 of the frame 14 pivotally thereinto, the member 66 being also slidable along the side member 24. When the frame-engaging member 66 is thus mounted on the frame 14, the notches 60 also loosely receive portions of the side member 24 of the frame 14 thereinto. The body member 48 is thereby free to pivot about its longitudinal axis by virtue of rotation of said body member 48 in a plane perpendicular thereto about the frame-engaging member 66 and ball joint 72. The body member 48 is also capable of pivotal movement about the side member 24 of the frame 14 by virtue of the mounting of a portion of said side member 24 within the recess 68 in the frame-engaging member 66. Therefore, when the trigger mechanism 16 is mounted to the frame 14 and surmounted as described hereinabove by the latch 26, a pair of the notches 38 in the side walls of the latch 38 engage a portion of the side member 24 of said frame 14 immediately above the annular flange 58 of the body member 48, lower edge surfaces of the side walls 30 abutting the shoulder 64 of said body member 48. A force of sufficient level exerted against any one or both of the prongs 42 from any direction will cause the body member 48 to be angularly displaced on the mounting provided by the member 66 and the ball joint 72, at least a portion of the shoulder 64 biasing against at least a portion of the lower edge surfaces of the side walls 30 of the latch 26 to displace the latch 26 slightly outwardly of the frame 14, thereby to disengage the side member 24 of the frame 14 from the notches 38 in said latch 26. The trap 10 is thereby caused to be sprung.

The trigger mechanism 16 is caused to exhibit a "universal" response to force exerted on the prongs 42, the structure of the body member 48, the frame-engaging member 66, and the ball joint 72 allowing angular movement of the body member 48 in any requisite of freedom to cause the latch 26 to be dislodged from the set position to spring the trap 10. Since the trigger mechanism 16 is sensitive to force exerted against the prongs 42 from any radial orientation, the trap 10 can be sprung by an animal entering the trap or contacting the prongs 42 from essentially any direction. The force required to disengage the latch 26 can be varied by setting the side member 24 within a selected pair of notches 38, thereby providing selectivity in the sensitivity and speed of action of the trap 10. The present trigger mechanism 16 can be disposed on either of the frames 12 or 14 and on any portion of said frames as long as the prongs 42 are caused to extend inwardly of the trap 10. The distance of the trigger mechanism 16 from either end of the frames can be adjusted by sliding both the trigger mechanism 16 and the latch 26 along the respective side members 22 and 24, the trap 10 being settable with the latch and trigger mechanism at any position along said side members 22 and 24 or even along portions of the frames which are perpendicular to the side members. Positioning of a trigger such as the trigger mechanism 16 to provide desired results are discussed in greater detail in U.S. Pat. No. 3,010,245.

While the wire stock from which the frames 12 and 14 are formed is preferably round or cylindrical, it is to be understood that wire stock of square or other cross section can be utilized with appropriate modification to the latch 26 and notches 38 inter alia, the principles underlying the present invention remaining constant regardless of such modification. It is to be further understood that certain other substantial changes could be effected to the structure shown in the drawings and described herein, many of which changes can be readily inferred from a disclosure of the patents expressly referred to hereinabove and from similar prior art. Accordingly, the invention is to be limited only by the scope of the claim appended hereto.

The embodiments of the invention in which an exclusive property or privilege is claimed are defined as follows:

1. In an animal trap having similar first and second frames, each frame having side members serving as jaws and end portions extending therebetween, the end portions being pivotally connected for relative rotation of the frames between set and closed positions about a common pivot axis, and at least one actuator slidably carried on the frames to effect rapid and forceful rotation of said frames about said pivot axis, an improved trigger means for releasably maintaining the trap in set position, comprising, when the trap is in the set position:

a latch pivotally carried on one of said frames, the latch comprising an arm member having at least one notch spaced along said arm member and adapted to receive a portion of the other frame in said notch to hold the frame in a set position; and, a trigger mechanism pivotally carried on the other frame, the trigger mechanism comprising, a frame engaging member having a recess formed in an upper surface thereof, the recess receiving a portion of the other frame therein for pivotal movement of the frame engaging member about said portion of the other frame, a body member having a recess formed therein, at least a portion of the frame engaging member being loosely received within the recess in the body member, means for mounting the frame engaging member within the recess of the body member for relative rotation therebetween; and cam means on at least a portion of the body member for engaging at least portions of the latch, the body member being angularly displaceable about said portion of said other frame in any direction to release said other frame from said notch and thereby to release said frames for relative rotation.

2. The apparatus of claim 1 and further comprising:
means carried on the body member and extending into the interior of the trap for contact with an animal entering the trap from any direction, contact with said last-mentioned means causing a displacing force to be exerted on the body member.

3. The apparatus of claim 2 wherein the last-mentioned means comprises at least one prong-like member.

4. The apparatus of claim 2, wherein the last-mentioned means comprise a pair of spaced prongs.

5. The apparatus of claim 4 and further comprising means for retaining the spaced prongs on the body member.

6. The apparatus of claim 2 wherein the last-mentioned means has a portion thereof extending laterally to major portions of said means to position said major portions within a selected portion of the interior of the trap.

7. The apparatus of claim 6 wherein the last-mentioned means comprises a length of wire-like stock, an anterior end portion thereof being connected to the body member, portions of the stock adjacent said anterior end portion extending laterally to major portions of said stock, the major portion of said stock extending from said adjacent portions at an angle toward the interior of the trap.

8. The apparatus of claim 1 wherein the latch is formed of spaced side walls, the notch being comprised of laterally aligned cut-away portions formed in each of the side walls, the trigger mechanism being surmounted by the latch, the notch in the latch and the recess in the frame engaging member substantially enclosing the portion of the other frame received within said recess, the cam means on the body member contacting portions of the lower edges of the spaced side walls.

9. The apparatus of claim 8 wherein the cam means comprises an annular flange disposed about the periphery of the recess in the body member, planar surface portions of the flange contacting the portions of the lower edges of the spaced side walls, raised abutments being disposed on the flange adjacent the planar surface portions and disposed between spaced portions of said planar surface portions, the raised abutments being dimensioned to be received between the spaced side walls of the latch.

10. The apparatus of claim 9 wherein the annular flange has aligned notches formed therein, the notches being spaced from the abutments about the periphery of the flange at relative angles of substantially 90°, the notches receiving portions of the other frame thereinto.

11. The apparatus of claim 8 wherein the latch is formed with a plurality of spaced notches formed in the side walls thereof.

12. The apparatus of claim 1 wherein the recess in the body member has a floor portion interiorly of the body member, the floor portion having an aperture formed therein, the body member further having a second recess formed therein and spaced from the first-mentioned recess in the body member, the aperture communicating the first-mentioned recess in the body member with said second recess, the means for mounting the frame engaging member within the recess in the body member comprising a ball joint having a neck portion, the neck portion being received within the aperture and the ball joint being received within the second recess, the anterior end of the neck portion connecting to the frame engaging member.

* * * * *